(12) United States Patent
Davies, Jr. et al.

(10) Patent No.: US 7,954,788 B2
(45) Date of Patent: Jun. 7, 2011

(54) METHODS AND APPARATUS TO ALIGN A SEAT RING IN A VALVE

(75) Inventors: Lonnie Oscar Davies, Jr., Newton, IA (US); David J. Westwater, Albion, IA (US)

(73) Assignee: Fisher Controls International, LLC, St. Louis, MO (US)

( * ) Notice: Subject to any disclaimer, the term of this patent is extended or adjusted under 35 U.S.C. 154(b) by 418 days.

(21) Appl. No.: 11/778,410

(22) Filed: Jul. 16, 2007

(65) Prior Publication Data

US 2009/0020720 A1    Jan. 22, 2009

(51) Int. Cl.
*F16K 1/42* (2006.01)
(52) U.S. Cl. ........ 251/365; 251/360; 251/333; 251/334; 251/359
(58) Field of Classification Search ............... 251/318, 251/333, 334, 359, 360, 364, 365
See application file for complete search history.

(56) References Cited

U.S. PATENT DOCUMENTS

| | | | | |
|---|---|---|---|---|
| 2,969,218 | A * | 1/1961 | Shaw ............................ | 251/333 |
| 3,174,718 | A | 3/1965 | Bowen et al. | |
| 3,362,680 | A * | 1/1968 | Weiss .......................... | 251/360 |
| 3,648,718 | A * | 3/1972 | Curran ......................... | 137/269 |
| 3,762,685 | A * | 10/1973 | Curran ......................... | 251/362 |
| 4,064,904 | A * | 12/1977 | Tolnai .......................... | 137/454.5 |
| 4,542,879 | A * | 9/1985 | Stein ............................ | 251/360 |
| 6,003,551 | A | 12/1999 | Wears | |
| 6,889,702 | B2 * | 5/2005 | Hall et al. ................... | 137/315.41 |

FOREIGN PATENT DOCUMENTS

| | | |
|---|---|---|
| GB | 414518 | 8/1934 |
| GB | 631750 | 11/1949 |
| GB | 2332261 | 6/1999 |

OTHER PUBLICATIONS

International Search Report for PCT/US2008/069846, Oct. 21, 2008, 4 pages.
Written Opinion of the International Searching Authority for PCT/US2008/069846, Oct. 21, 2008, 6 pages.
European Patent Office, "Office Communication," issued in connection with European application serial No. 08 781 727.6 on Jul. 16, 2010, 3 pages.
State Intellectual Property Office of P.R. China, "First Office Action," issued in connection with Chinese application serial No. 200880023978.2 on Aug. 4, 2010, 8 pages.

* cited by examiner

*Primary Examiner* — John K Fristoe, Jr.
(74) *Attorney, Agent, or Firm* — Hanley, Flight & Zimmerman LLC

(57) ABSTRACT

Methods and apparatus to align a seat ring in a valve are described. An example fluid valve includes a valve body having a curved internal surface to receive a seat ring and a seat ring having a sealing surface to receive a movable control member and a curved surface opposite the sealing surface to engage the curved internal surface of the valve body.

22 Claims, 3 Drawing Sheets

US 7,954,788 B2

METHODS AND APPARATUS TO ALIGN A SEAT RING IN A VALVE

FIELD OF THE DISCLOSURE

The present disclosure relates generally to valves and, more particularly, to methods and apparatus to align a seat ring in a valve.

BACKGROUND

Valves are commonly used in process control systems to manipulate a flow of fluid. In general, a valve may regulate a process variable by selectively allowing or inhibiting fluid to reach a destination. To perform such a regulation, a control element or member (e.g., a plug) may be disposed in a path of the fluid. Typically, the control member is configured to engage a sealing structure (e.g., a seat ring) that encompasses the flow path through the valve. An engagement between the sealing structure and the control member provides a closure to block the flow of fluid through the valve. Further, a guide (e.g., a cage) may be in contact and aligned with the sealing structure to guide or otherwise facilitate the movement of the control member.

In operation, the control member may be moved toward and engaged with and/or moved away from the seal via the guide to control the flow of fluid through the valve. Thus, any misalignment between these components may cause undesired leakage. Variations in the structure or dimensions of the components arising from, for example, an imprecise manufacturing process may cause such a misalignment.

SUMMARY

An example fluid valve includes a valve body having a curved internal surface to receive a seat ring. The example fluid valve also includes a seat ring having a sealing surface to receive a movable control member and a curved surface opposite the sealing surface to engage the curved internal surface of the valve body.

Another example seat ring includes an aperture to receive a movable control member and an outer surface having a curved portion extending away from the aperture toward an outer edge of the seat ring to engage a valve body having a complementary curved portion. The curved portion of the outer surface of the seat ring is configured to align the aperture and the movable control member.

An example method of assembling a fluid valve includes inserting a seat ring having an outer surface including a curved portion into a valve body, positioning a guide on the seat ring, and driving the guide against the seat ring to cause the curved portion of the seat ring to move against the valve body to align the seat ring and the guide.

DETAILED DESCRIPTION

In general, the example apparatus and methods to align a seat ring in a valve described herein substantially eliminate leakage caused by misalignment of valve components. More specifically, many known seat ring and valve body configurations utilize a seat ring that is engaged with the valve body via mating shoulders or other similar rectilinear surfaces. Such known mating surfaces are not typically capable of maintaining a sealed engagement between the seat ring and the valve body and, at the same time, compensating for misalignment between a movable control member (e.g., a plug) and a sealing surface of the seat ring. On the contrary, with these known configurations, if the seat ring is forced into alignment with the movable control member, the seal between the seat ring and the valve body may be compromised. Conversely, if the seat ring is forced into solid engagement with the valve body, the movable control member may not be able to achieve tight shut off against the sealing surface of the seat ring.

In contrast to the above-mentioned known seat ring and valve body configurations, the example apparatus and methods described herein use curved (e.g., spherical, conical, elliptical, etc.) mating surfaces between the seat ring and the valve body to enable the seat ring to move relative to the valve body while maintaining a sealed engagement with the valve body. In the examples described herein, the mating surfaces are curved so that during assembly of a valve any misalignment (e.g., due to manufacturing tolerances) between the guide or cage, the movable control member (e.g., a plug), and the valve body can be automatically compensated for by a movement of the seat ring relative to the valve body.

Figure 1:
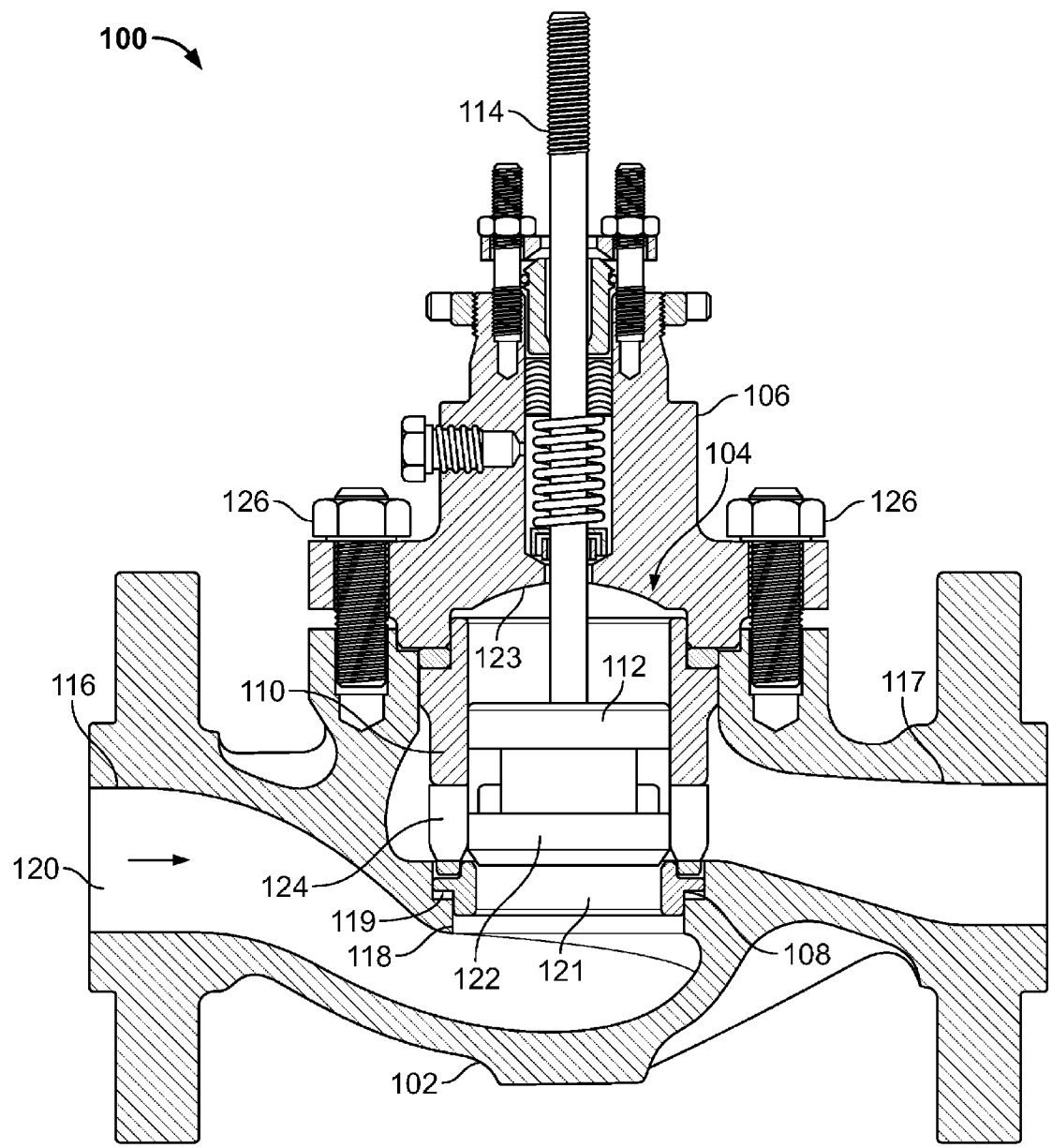
FIG. 1 illustrates an example portion of a known fluid valve.

Before describing the example methods and apparatus to align valve components mentioned above, a brief description of a known fluid valve is provided below in connection with FIG. 1. FIG. 1 illustrates an example of a known fluid valve 100, which includes a valve body 102, trim 104, and a bonnet 106. The trim 104 includes a plurality of components that vary the flow of the fluid through the valve 100. Specifically, the trim 104 includes a seat ring 108, a guide 110, a control member 112, and a stem 114. Of course, the valve 100 and, thus, the trim 104 may include additional components (e.g., gaskets, packing flanges, springs, etc.). However, for illustrative purposes, only the major components mentioned above are described in detail in connection with FIG. 1.

Generally, the valve body 102 is a housing or casing configured to facilitate the flow of a fluid from an inlet 116 through the valve 100 to an outlet 117. The valve body 102 supports or holds the trim 104 and, more particularly, includes seating surfaces for various valve components. For example, in FIG. 1, an internal surface 118 of the valve body 102 may include a shoulder 119 to receive the seat ring 108. As described further below, the characteristics (e.g., dimensional deviations from design values) of the internal surface 118 and the shoulder 119 may determine whether the valve components (e.g., the seat ring 10, the guide 110, the control member 112, etc.) are properly aligned.

As mentioned above, the trim 104 includes an assembly of components (e.g., the seat ring 108, the guide 110, the control member 112, and the stem 114) that cooperate to regulate the amount of fluid allowed to pass through the valve 100. The seat ring 108 is engaged with the shoulder 119, which is machined or shaped to include a planar surface to receive the seat ring 108. When the valve 100 is open, fluid (flowing in the direction indicated by an arrow 120 in FIG. 1) passes through an aperture 121 of the seat ring 108. To close the valve 100, the control member 112 engages a sealing surface 122 of the seat ring 108, thereby preventing the flow of fluid through the valve 100. Alternatively, the control member 112 may be positioned between a fully open and a fully closed position to achieve a desired fluid flow through the valve 100.

As illustrated in FIG. 1, the guide (e.g., a cage) 110 engages the seat ring 108 and surrounds a cavity 123 in which the control member 112 is disposed. In other words, the guide 110 facilitates the movement and alignment of the control member 112 and may be configured to include apertures or grooves to provide certain flow and/or control characteristics (e.g., dead band, gain, capacity, etc.) by modifying the configuration, profile, or shape of an orifice 124 through which the fluid flows.

In general, accurate alignment of the valve components described above minimizes or substantially eliminates leakage through the valve 100 (i.e., enables tight shut off. However, many known valves can exhibit misalignment of certain valve components caused by, for example, manufacturing tolerances. By way of example, the seat ring 108 may not be correctly received by the internal surface 118 and/or the shoulder 119 of the valve body 102. In other words, the internal surface 118 and/or the shoulder 119 of the valve body 102 may be dimensioned or shaped inaccurately such that the seat ring 108 cannot properly engage the internal surface 118 and/or the shoulder 119. For example, as described further below in connection with FIG. 2A, one side or portion of the seat ring 108 may be skewed or tilted causing a non-uniform load to be experienced along the sealing surface 122 of the seat ring 108. Because the remainder of the trim 104 components (i.e., the guide 110, the control member 112, and the stem 114) are either directly or indirectly coupled to the seat ring 108, any misalignment of the seat ring 108 relative to the valve body 102 may be propagated to the guide 110 as well as other valve components, thereby preventing the movable control member or plug 112 from forming a tight seal against the sealing surface 122.

Figure 2A:
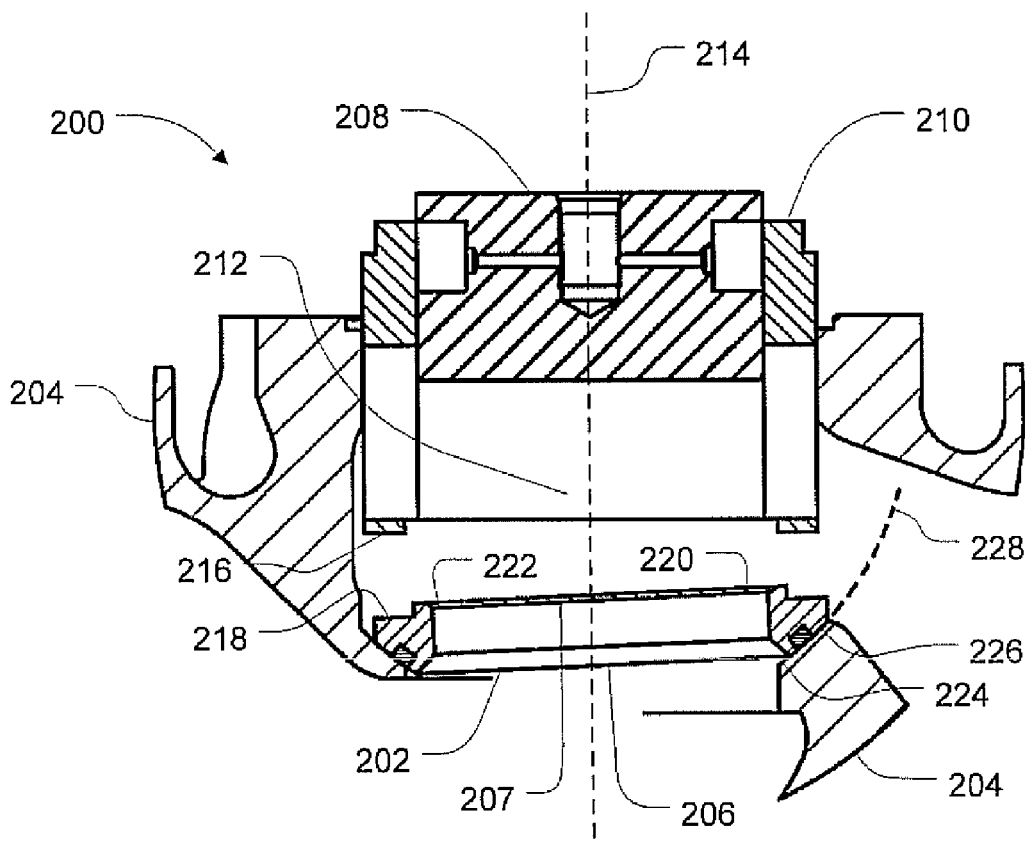
FIG. 2A is a cross-sectional view of a portion of a partially assembled example fluid valve including an example self-aligning seat ring.

FIG. 2A is a cross-sectional view of a portion of a partially assembled example fluid valve 200. A seat ring 202 is disposed in (e.g., inserted into) a valve body 204 to encompass a flow path within the valve 200. The seat ring 202 may be, for example, a cylindrical member having an aperture 206 through which the fluid may flow and a sealing surface 207. When the valve 200 is open, fluid may flow through the seat ring 202 to an output port of the valve. When the valve 200 is closed, a movable control member 208 (e.g., a plug) may engage the sealing surface 207 of the seat ring 202 to inhibit or prevent the flow of fluid through the valve 200.

The movable control member 208 may be encased by and configured to move within in a guide 210 (e.g., a cage) having an aperture 212 to enable an alignment between the control member 208 and the seat ring 202. In other words, the aperture 206 of the seat ring 202 and the aperture 212 of the guide 210, may be aligned by forcing the aperture 206, the aperture 212, and the movable control member 208 to be coaxially aligned to a centerline 214. The guide 208 may engage the seat ring 202 via, for example, complementary interlocking structures 216 and 218, which may be configured to maintain alignment between the seat ring 202 and the guide 208. In the example of FIG. 2A, the interlocking structure 218 on the seat ring 202 is depicted as a shoulder and the interlocking structure 216 of the guide 208 is depicted as a raised circumferential surface. However, any other complementary interlocking structures could be used instead. As described further below, the guide 208 may be driven against (e.g., via a hand-press fit) the seat ring 202 to engage the complementary interlocking structures 216 and 218.

In operation, upon insertion into the valve body 204, the seat ring 202 may be misaligned or skewed relative to the valve body 204. For example, as illustrated in FIG. 2A and discussed further below, one side 220 of the seat ring 202 may be tilted upwards relative to an opposing side 222 because a surface of the valve body 204 is imprecisely dimensioned or manufactured. In existing valves (as described above in connection with FIG. 1), such a defect may cause a misalignment that is propagated through the valve. More specifically, in existing valves, when a guide engages a misaligned seat ring, different sections of the seat ring experience varying seat loads (i.e., different contact forces at different points along the seat ring), which may lead to leakage around the seat ring when the valve is in a fully closed condition.

In contrast, the example valve 200 illustrated in FIG. 2A enables the seat ring 202 to experience a uniform load (i.e., a consistent or substantially constant or uniform contact force along the seat ring 202), thereby eliminating leakage caused by misalignment. To achieve a uniform load, the example valve 200 employs a plurality of curved or spherically-shaped surfaces that enable alignment corrections to be made automatically during assembly of the valve 200. More specifically, the valve body 204 includes a curved or spherically-shaped internal surface 224 to engage a complementary curved or spherically-shaped surface (e.g., a surface opposite the sealing surface 207) 226 of the seat ring 202. The curved surface 226 may extend away from the aperture 206 to engage the curved internal surface 224 of the valve body 204. The surfaces 224 and 226 may have substantially similar radii of curvature as indicated by a curved line 228 in FIG. 2A. The radius of curvature of each of the surfaces 224 and 226 may depend or be selected based on the dimensions of other valve components (e.g., the diameter of the guide 210). The curvature of the surfaces 224 and 226 allows the seat ring 202 to automatically move, shift, or adjust relative to the valve body 204 into proper alignment with the guide 210 during assembly of the valve 200.

For example, as shown in FIG. 2A, the one side 220 of the seat ring 202 may be misaligned (e.g., tilted or positioned higher) relative to the opposing side 222 of the seat ring 202 when disposed in the valve body 204. During assembly of the valve 200, when the guide 210 engages the seat ring 202 (e.g., when the complementary structures 216 and 218 engage or come into contact), the seat ring 202 may move into alignment with the guide 210 as the curved or spherically-shaped surfaces 224 and 226 move relative to one another. The alignment correction results from the higher load experienced by the skewed side 220, which forces the seat ring 202 to adjust its position to balance the load experienced along its sealing surface. Thus, instead of a rigid or fixed engagement with the valve body 204, the seat ring 202 in this example is movably engaged with the valve body 204 and can be aligned automatically during assembly of the valve 200, thereby minimizing or eliminating the leakage problems mentioned above.

Figure 2B:
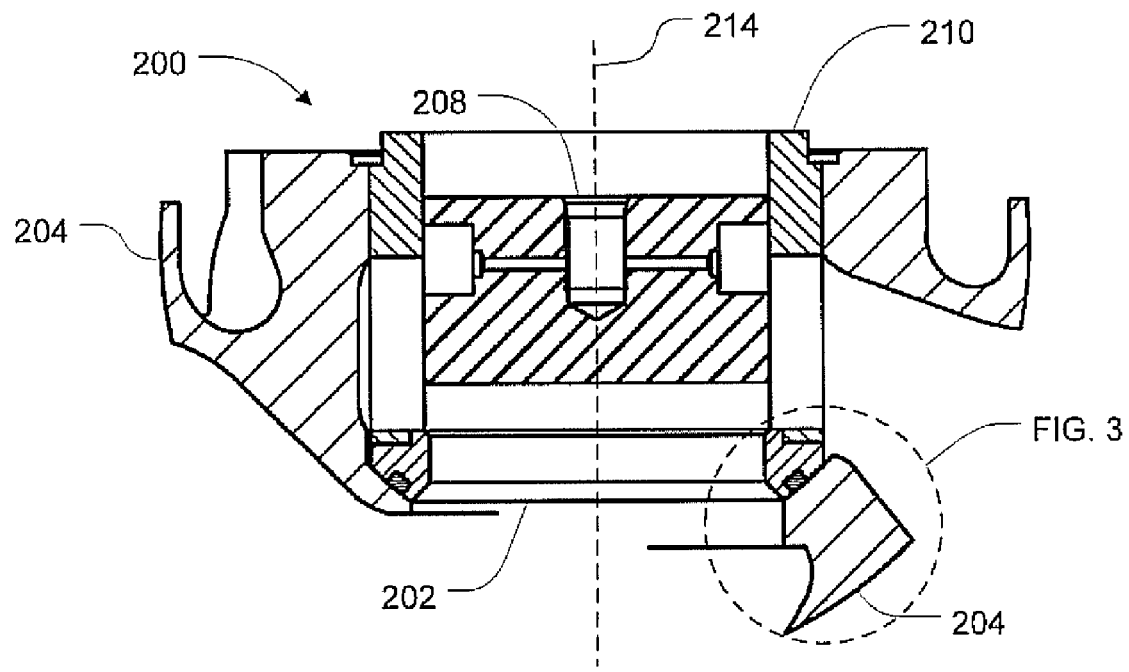
FIG. 2B is a cross-sectional view of the portion of the example fluid valve of FIG. 2A in a fully assembled condition.

FIG. 2B illustrates the example valve 200 after assembly. In use, the guide 210, which may or may not yet include the control member 208, engages the seat ring 202 within the valve body 204. As described above, any misalignment between the guide 210 and the seat ring 202 are eliminated upon engagement. The remainder of the valve components (e.g., the control member 208, a stem, gaskets, seals, etc.) are then assembled, maintaining the alignment (e.g., coaxial alignment to the centerline 214 described above) established between the guide 210 and the seat ring 202. A bonnet (not shown) or other suitable securing structure may then be installed to secure the engagements and, thus, the alignment between the components.

After the valve 200 is assembled, the control member 208 may then be moved (e.g., via an actuator coupled to a stem) to engage or disengage the seat ring 202, thereby inhibiting or allowing fluid to pass through the seat ring 202 and, thus, the valve 200. The alignment corrections provided by the curved surfaces 224 and 226 allow the control member 208 to make a uniform seal with the seat ring 202.

Figure 3:
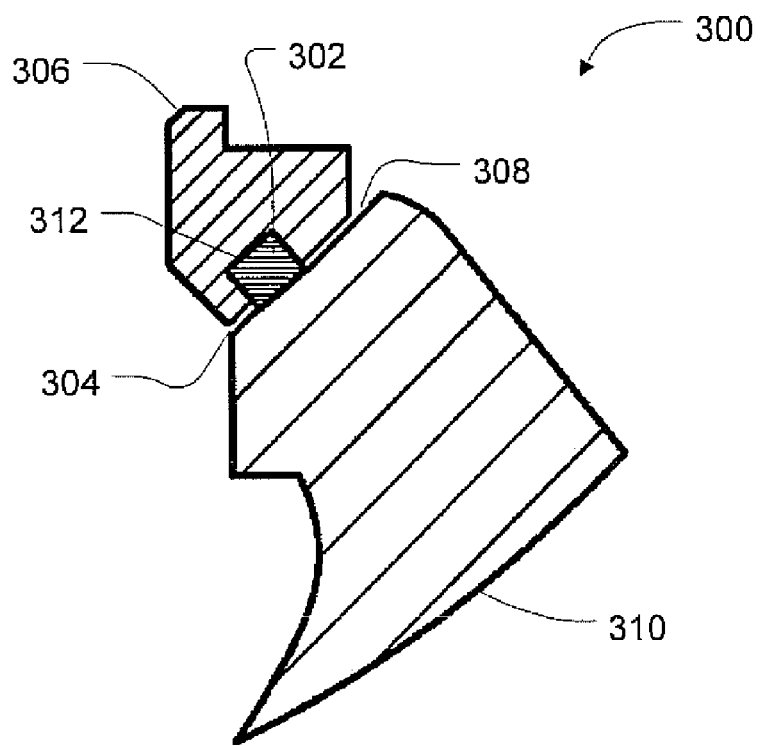
FIG. 3 is an enlarged cross-sectional view of an example engagement between an example seat ring and an example valve body that may be used to implement the example fluid valve of FIGS. 2A and 2B.

In addition, the example valves described herein (e.g., the valve 200 FIGS. 2A and 2B) may include a seat ring having a seal to provide a tight seal between the seat ring and a valve body. FIG. 3 is an enlarged cross-sectional view of a portion of such configuration within a valve 300. The valve 300 includes a seal 302 disposed about a circumference of a curved surface 304 of a seat ring 306 to engage a curved surface 308 of a valve body 310. For example, the seat ring 306 may include a recess 312 (e.g., an annular groove positioned around an aperture of the seat ring 306) to receive the seal 302. The seal 302 may be, for example, configured as a seal bead or an o-ring. However, alternative profiles (e.g., a rectangular profile and/or a sealing engagement spaced around the seat ring 306) may be used to achieve a similar mechanical coupling. The seal 302 may be disposed in the recess 312 and constructed to make a sealing engagement with the curved surface 308 of the valve body 310. Additionally or alternatively, the curved surface 308 of the valve body 310 may include a groove or channel to receive the seal 302.

In operation, the valve 300 may include a press-fit seal, thereby allowing the seat ring 306 to move about the curved surface 308 of the valve body 310, align itself with one or more valve components (e.g., the guide 210 of FIG. 2A), and maintain the alignment of the valve components via the seal 302.

For valves used in low temperature applications, the seal 302 may be, but not necessarily, made of an elastomeric material and may further include fabric or other reinforcing layers to provide a desired stiffness, strength, life cycle, etc. However, in other applications, the seal 302 may be constructed of a composite material or a metal material to withstand higher temperature applications.

Figure 4:
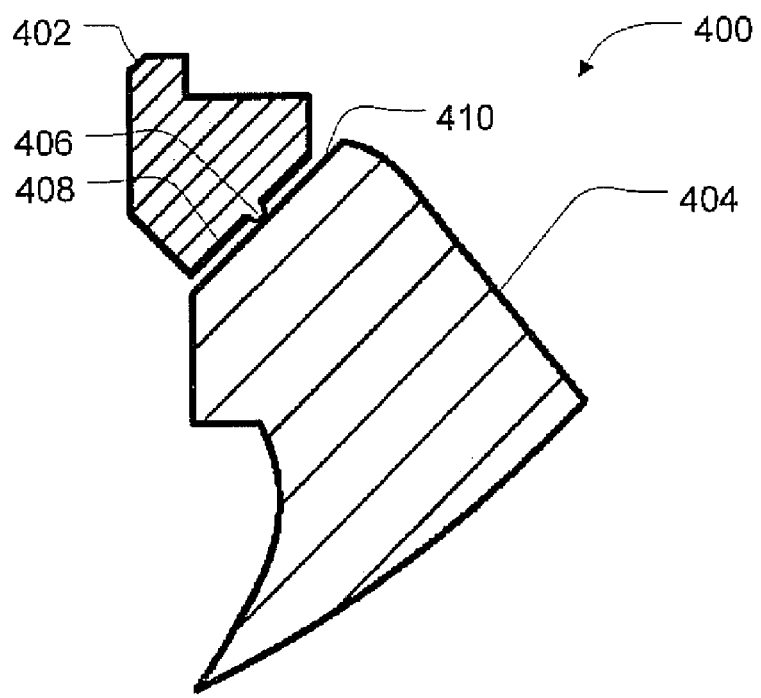
FIG. 4 is an enlarged cross-sectional view of another example engagement between an example seat ring and an example valve body that may be used to implement the example fluid valve of FIGS. 2A and 2B.

In another example, shown in FIG. 4, an example valve 400 utilizes a metal-to-metal contact to maintain a sealed engagement between a seat ring 402 and a valve body 404. The valve 400 includes a circumferential protrusion (e.g., a bead) 406 extending from a curved surface 408 of the seat ring 402. The circumferential protrusion 406 may be configured to create a groove or indentation (not shown) on an internal surface 410 of the valve body 404.

In operation, the protrusion 406 may create an indentation when a substantial force is applied to the seat ring 402. For example, the seat ring 402 may be inserted into the valve body 404, after which a guide (not shown) may engage the seat ring 402 (similar to the process described above in connection with FIG. 2B). Using the techniques and/or methods described above to align the seat ring 402 and the guide, a downward force may be applied to the components (i.e., the seat ring 402 via the guide), thereby causing the protrusion 406 to be driven to indent or embed itself in the surface 410 of the valve body 404. The protrusion 406, disposed within the newly formed indentation, may then maintain the position of the seat ring 402 within the valve body 404 (i.e., creating a mechanically secured engagement similar to the seal described above in connection with FIG. 3). Additionally or alternatively, the force that creates the indentation may be applied at different stages of the valve assembly. As another example, securing (e.g., tightening fasteners) a bonnet (not shown) after the internal valve components (e.g., a control member, a guide, a stem, gaskets, etc.) are assembled may cause the protrusion 406 to create an indentation. Other example valves may include more than one protrusion to maintain the engagement between a seat ring and a valve body.

In other example valves, a protrusion may be disposed on an internal surface (e.g., the internal surface 410 of FIG. 4) of a valve body (e.g., the valve body 404 of FIG. 4). In such an example, the protrusion extending from the valve body may create an indentation on the surface of a seat ring (e.g., the seat ring 402 of FIG. 4) in response to an applied force, thereby facilitating an alignment similar to the operation of the example valve 400 of FIG. 4.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A fluid valve, comprising:
   a valve body having a curved internal surface;
   a seat ring having a sealing surface to engage a movable control member, the seat ring having a curved surface to engage the curved internal surface of the valve body to enable the seat ring to shift along the internal surface of the valve body, wherein a normal of the curved surface of the seat ring intersects a centerline of the fluid valve at a substantially non-orthogonal angle; and
   a cage to operatively engage the seat ring to shift the sealing surface of the seat ring into alignment with an internal bore of the cage.

2. A fluid valve as defined in claim 1, further comprising a seal disposed between the curved surface of the seat ring and the curved internal surface of the valve body.

3. A fluid valve as defined in claim 2, wherein the seal comprises at least one of a metal material, an elastomeric material, or a composite material.

4. A fluid valve as defined in claim 1, wherein the curved surface of the seat ring and the curved internal surface of the valve body have substantially equal radii of curvature.

5. A fluid valve as defined in claim 1, wherein the curved surface of the seat ring includes a protrusion extending from the curved surface configured to form an indentation into the curved internal surface of the valve body during assembly of the fluid valve.

6. A fluid valve as defined in claim 1, wherein a surface of the seat ring comprises a shoulder to receive the cage.

7. A fluid valve as defined in claim 1, wherein installment of the cage into the fluid valve is to lock the sealing surface of the seat ring into alignment with the internal bore of the cage.

8. A fluid valve as defined in claim 1, wherein the seat ring comprises an aperture to receive the movable control member.

9. A fluid valve as defined in claim 8, wherein the curved surface of the seat ring and the curved internal surface of the valve body are configured to coaxially align the aperture with the movable control member in response an engagement of the cage with the seat ring.

10. A fluid valve as defined in claim 1, wherein the curved surface of the seat ring and the curved internal surface of the valve body are configured to coaxially align the sealing surface of the seat ring with the internal bore of the cage in response to a force applied to the seat ring by an installment of the cage into the fluid valve.

11. A fluid valve as defined in claim 10, wherein the force applied to the seat ring comprises a force applied by a bonnet secured to the fluid valve.

12. A seat ring for use in a fluid valve, comprising:
an aperture to receive a movable control member;
a sealing surface to engage the movable control member;
an outer surface to engage a curved portion of a valve body, wherein a cross-section of the seat ring taken along a plane parallel to an axis along which the aperture is to receive the movable control member includes a curved portion that enables the outer surface of the seat ring to shift along the curved portion of the valve body; and
a portion configured to operatively receive a cage to shift the sealing surface of the seat ring into alignment with an internal bore of the cage.

13. A seat ring as defined in claim 12, further comprising a seal to form a seal between the seat ring and the valve body.

14. A seat ring as defined in claim 13, wherein the seal is disposed within a recess of the seat ring.

15. A seat ring as defined in claim 13, wherein the seal comprises at least one of a metal material, an elastomeric material, or a composite material.

16. A seat ring as defined in claim 12, wherein the portion of the seat ring comprises a shoulder to receive a complementary shoulder of the cage, wherein the cage applies a force to the seat ring during assembly of the fluid valve to cause the seat ring to shift into alignment.

17. A seat ring as defined in claim 16, wherein the force applied by the cage to the seat ring is a force applied to the seat ring by an installment of the cage into the fluid valve.

18. A seat ring as defined in claim 12, further comprising a protrusion extending from the curved portion of the outer surface of the seat ring configured to form an indentation within the complementary curved portion of the valve body in response to an applied force.

19. A seat ring as defined in claim 16, wherein the force applied by the cage to the seat ring is a force applied to the seat ring via a bonnet secured to the fluid valve.

20. A method of assembling a fluid valve, comprising:
inserting a seat ring having an outer surface including a curved portion into a curved internal portion of a valve body;
positioning a guide on the seat ring; and
driving the guide against the seat ring to cause the curved portion of the seat ring to rotate about an axis perpendicular to a centerline of the fluid valve along the curved internal portion of the valve body to align the seat ring and the guide.

21. A method as defined in claim 20, wherein the seat ring and the guide include complementary structures to mechanically couple the seat ring and the guide.

22. A method as defined in claim 21, wherein driving the guide against the seat ring comprises hand-press fitting the seat ring and the guide together to engage the complementary structures.

* * * * *